(12) United States Patent
Betz, II et al.

(10) Patent No.: US 7,234,451 B2
(45) Date of Patent: Jun. 26, 2007

(54) DUAL FUEL PUMP CONFIGURATION FOR SADDLE FUEL TANKS

(75) Inventors: Gerard G. Betz, II, Pleasant Ridge, MI (US); Robert Halsall, Washington, MI (US); Richard H. Krentz, Bloomfield Hills, MI (US); Vincent J. Marsala, Auburn Hills, MI (US); Philip A. Yaccarino, Troy, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 152 days.

(21) Appl. No.: 11/190,426

(22) Filed: Jul. 27, 2005

(65) Prior Publication Data

US 2007/0023014 A1 Feb. 1, 2007

(51) Int. Cl.
*F02M 37/04* (2006.01)
(52) U.S. Cl. .................. 123/509; 123/514; 137/565.33
(58) Field of Classification Search ................. 123/509, 123/514; 137/576, 565.33
See application file for complete search history.

(56) References Cited

U.S. PATENT DOCUMENTS

| | | | | |
|---|---|---|---|---|
| 4,860,714 A | * | 8/1989 | Bucci | 123/514 |
| 5,983,932 A | * | 11/1999 | Wagner et al. | 137/587 |
| 6,276,342 B1 | * | 8/2001 | Sinz et al. | 123/514 |
| 6,283,142 B1 | * | 9/2001 | Wheeler et al. | 137/265 |
| 6,371,153 B1 | * | 4/2002 | Fischerkeller et al. | 137/265 |
| 6,792,966 B2 | * | 9/2004 | Harvey | 137/265 |
| 6,871,640 B2 | * | 3/2005 | Atwood et al. | 123/509 |
| 7,069,913 B1 | * | 7/2006 | Crary | 123/509 |

* cited by examiner

*Primary Examiner*—Thomas Moulis
(74) *Attorney, Agent, or Firm*—Laura C. Hargitt (57) ABSTRACT

A dual fuel pump fuel extraction system for saddle fuel tanks. A primary modular reservoir assembly (MRA) includes an electric primary fuel pump located in the primary sump of a saddle fuel tank and a secondary MRA including an electric secondary fuel pump located in the secondary sump of the saddle fuel tank, wherein both the primary and secondary fuel pumps extract fuel from the primary sump and simultaneously transfer fuel between the primary and secondary sumps so as to thereby ensure both the primary and secondary fuel pumps have fuel, without starving one before the other, until fuel becomes depleted from the saddle fuel tank.

20 Claims, 7 Drawing Sheets

DUAL FUEL PUMP CONFIGURATION FOR SADDLE FUEL TANKS

TECHNICAL FIELD

The present invention relates to automotive fuel tanks, and more particularly to saddle fuel tanks. Still more particularly, the present invention relates to improved fuel pump configurations for saddle fuel tanks.

BACKGROUND OF THE INVENTION

Automotive saddle fuel tanks have a tank shell configured with a centrally disposed bight in the bottom thereof. The bight provides an exterior concavity which is intended to provide accommodation for drivetrain and/or exhaust components of the motor vehicle to pass freely therethrough. While providing free space at the exterior of the tank shell, the bight also provides a riser within the fuel tank which effectively creates two sumps on either side thereof, wherein the two sumps conjoin in the space of the fuel tank higher than the height of the riser. In view of the presence of the bight, wherein the riser creates two separated sumps, attention must be carefully given to the fuel extraction system.

Figure 1A:
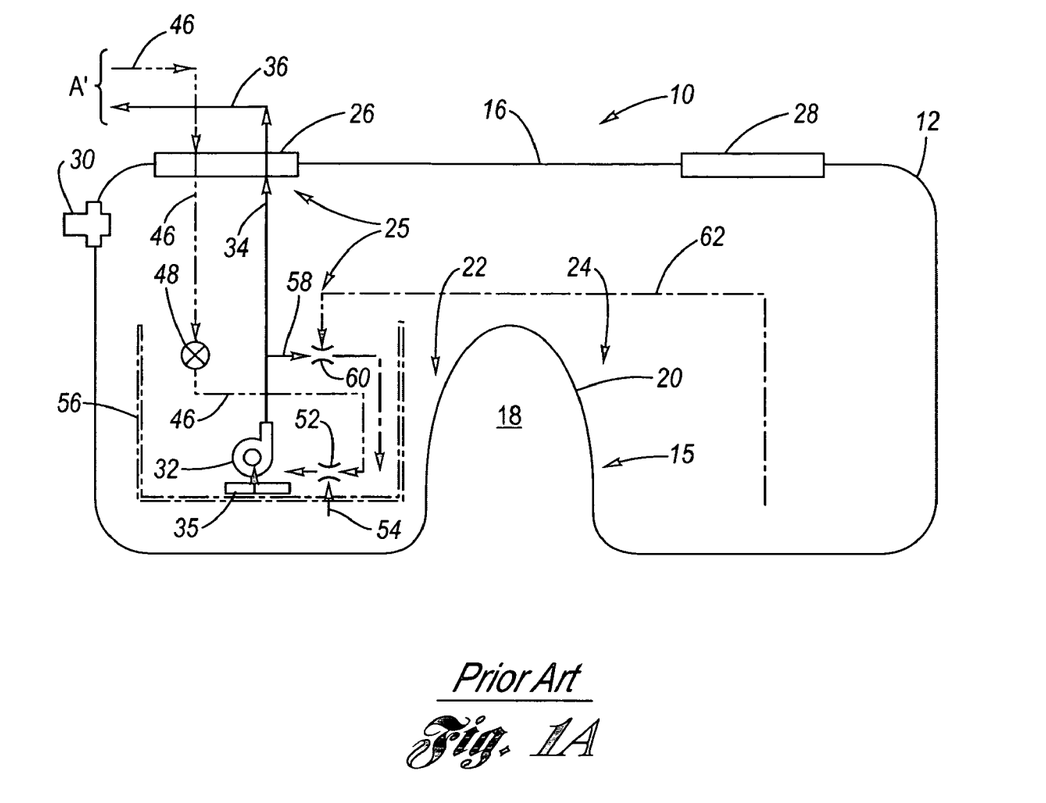
FIG. 1A is a schematic view of a saddle fuel tank equipped with a prior art fuel extraction system.

FIG. 1A is a sectional schematic view of a conventional saddle fuel tank 10. The tank shell 12 defines a bottom 14 and an oppositely disposed top 16, wherein a bight 15 provides a concavity 18 exterior to the fuel tank and a riser 20 interior to the fuel tank, in turn providing a primary sump 22 and a secondary sump 24.

Figure 1B:
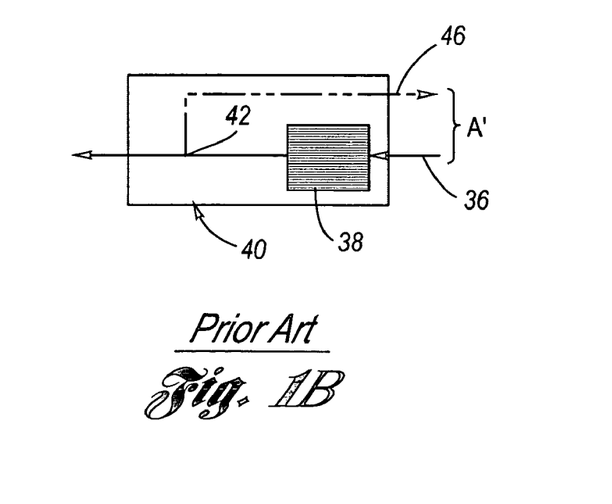
FIG. 1B is a schematic view of a filter assembly know in the prior art for connection to the prior art fuel extraction system of FIG. 1A.

The saddle fuel tank 10 has a fuel extraction system in the form of a single modular reservoir assembly (MRA) 25. The top 16 of the tank shell 12 carries primary and secondary modular reservoir assembly (MRA) covers 26, 28, wherein the primary MRA cover is a part of the single MRA 25. An inlet check valve 30 provides an entry for fuel into the fuel tank 10, wherein the primary sump 22 is identified as the sump first filled by fuel introduced from the inlet check valve. An in-tank disposed electric fuel pump 32, when energized, pumps fuel from the primary sump 22, through a strainer 35, and, via a feed line 34, out of the fuel tank through the primary MRA cover 26, and, via a feed line 36 to a fuel filter 38 situated in a filter assembly 40, whereby the fuel is then filtered by the fuel filter 38.

Fuel which is not used by the engine is returned, via a return port 42 on the fuel line 44 upstream of the filter 38, to the fuel tank 10 through the primary MRA cover 26 and, in turn, through a return line 46, to an in-tank pressure regulator 48. The in-tank pressure regulator 48 maintains a set pressure of the fuel in the fuel line 44 upstream of the return port 42, and bypasses fuel via a return line 50 to a scavenge jet pump 52. The scavenge jet pump 52 scavenges bulk fuel 54 into a primary sump reservoir bucket 56, wherein the bucket is connected to the primary MRA cover 26 by rods (not shown). Additionally, feed fuel from the electric pump 32 is bled off via a bleed line 58 to run a transfer jet pump 60. The transfer jet pump 60 draws fuel from the secondary sump 24 via a transfer line 62 into the primary sump reservoir bucket 56.

The aforedescribed saddle fuel tank fuel system is limited by the fact that only one pump can be placed at the primary sump, since the primary and secondary MRA covers are only 4.5 inches in diameter.

What remains needed in the art is a dual electric pump saddle tank fuel extraction system which avails itself of both the primary and secondary sumps for fuel extraction system packaging, wherein fuel is continually available to both electric pumps without starving one before the other when fuel becomes depleted.

SUMMARY OF THE INVENTION

The present invention is a generally symmetrically configured, dual electric fuel pump saddle tank fuel extraction system which avails itself of both the primary and secondary sumps of the saddle fuel tank for fuel extraction system packaging, wherein fuel is continually available to both electric fuel pumps without starving one before the other when fuel in the tank becomes completely depleted.

The dual fuel pump fuel extraction system according to the present invention is composed of a primary modular reservoir assembly (MRA) including an electric primary fuel pump located in the primary sump of a saddle fuel tank and a secondary MRA including an electric secondary fuel pump located in the secondary sump of the saddle fuel tank, wherein both the primary and secondary fuel pumps extract fuel from the primary sump and simultaneously transfer fuel between the primary and secondary sumps so as to thereby ensure both the primary and secondary fuel pumps have fuel, without starving one before the other, until fuel becomes depleted from the saddle fuel tank.

The primary fuel pump extracts fuel from the primary sump and transfers the fuel exterior to the saddle fuel tank via a primary MRA cover, and the secondary fuel pump extracts fuel from the primary sump and transfers the fuel exterior to the saddle fuel tank via the secondary MRA cover. Thereafter, the fuel from the primary and secondary fuel pumps is delivered to a filter assembly. Any excess fuel (fuel not presently needed by the engine) is then returned from the filter assembly to the saddle fuel tank via return lines passing respectively through each of the primary and secondary MRA covers. A pressure regulator may be located at the filter assembly or a pair of pressure regulators may be provided in the saddle fuel tank at the return lines downstream of the primary and secondary MRA covers. Preferably, fuel transfer between the primary and secondary fuel pumps is, in part, provided by a plurality of jet pumps located in the primary and secondary MRAs.

Accordingly, it is an object of the present invention to provide a fuel extraction system for a saddle fuel tank, wherein an electric fuel pump is located in each of the sumps, respectively, wherein fuel is extracted from the primary sump, and wherein fuel is internally transferred between the sumps so that the pumps can only run dry simultaneously.

This and additional objects, features and advantages of the present invention will become clearer from the following specification of a preferred embodiment.

BRIEF DESCRIPTION OF THE DRAWINGS

The description herein makes reference to the accompanying drawings wherein like reference numerals refer to like parts throughout the several views.

DESCRIPTION OF THE PREFERRED EMBODIMENT

Referring now to the Drawing, FIGS. 2 through 5 depict several preferred embodiments of the dual fuel pump fuel extraction system 100–400 according to the present invention, FIGS. 6 through 9 depict several embodiments of a fuel delivery systems 500–800 according to the present invention for selected use with the aforesaid preferred embodiments of the dual fuel pump fuel extraction system, and FIGS. 10 through 13 depict exemplar modifications of selected embodiments 100, 500.

Each of FIGS. 2 through 5 depict a sectional schematic view of a saddle fuel tank 80 having a tank shell 82 defining a bottom 84 and an oppositely disposed top 86, wherein a bight 88 at the bottom provides a concavity 90 exterior to the fuel tank and a riser 92 interior to the fuel tank, in turn providing a primary sump 94 and a secondary sump 96, wherein inlet check valve 98 through the tank shell provides an entry for fuel into the saddle fuel tank above the primary sump 94.

Figure 2:
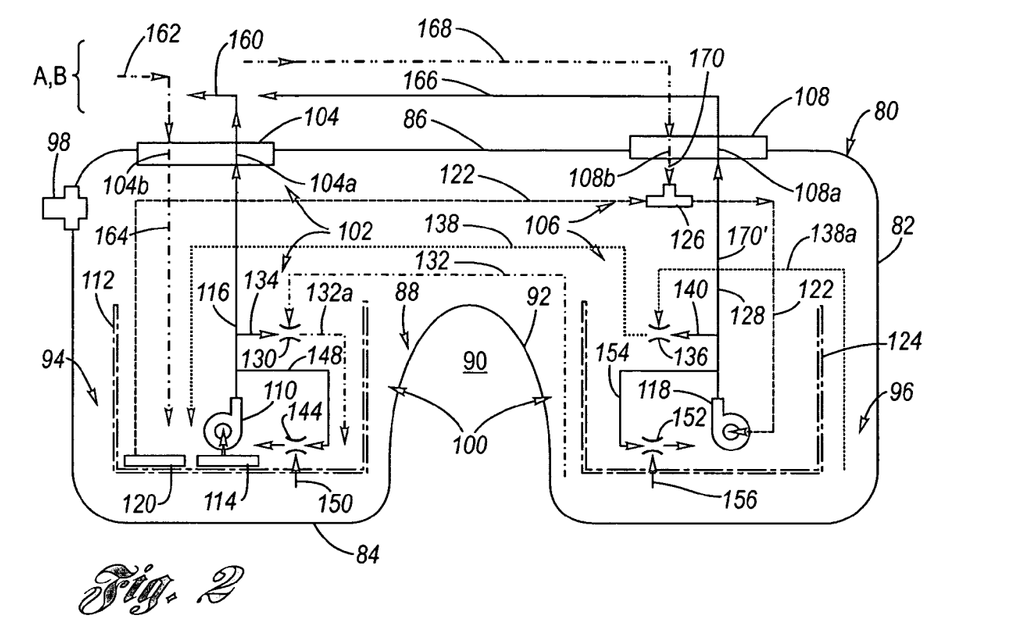
FIG. 2 is a schematic view of a saddle fuel tank equipped with a first preferred embodiment of the dual fuel pump fuel extraction system according to the present invention, wherein a return tee is a component of a secondary fuel module.

Turning attention now to FIG. 2, the first embodiment of the dual fuel pump fuel extraction system 100 will be detailed.

The saddle fuel tank 80 has a dual fuel pump fuel extraction system 100 in the form of dual modular reservoir assemblies (MRAs), wherein a primary MRA 102 is generally situated in the primary sump 94 and includes a primary MRA cover 104 formed in the top 86 of the tank shell 82, and a secondary MRA 106 which is generally situated in the secondary sump 96 and includes a secondary MRA cover 108 formed in the top of the tank shell, wherein the primary and secondary MRA covers contain feed and return ports and may utilize quick connects.

The primary MRA 102 includes an electric primary fuel pump 110 which draws fuel from a primary bucket 112 via a strainer 114, all of which are located in the primary sump 94. The primary bucket 112 and the primary MRA cover 104 are connected together, as for example by rods (not shown). Fuel is pumped under pressure by the primary fuel pump 110 to a primary feed port 104a of the primary MRA cover 104 via a primary feed line 116.

The secondary MRA 106 includes an electric secondary fuel pump 118 situated in the secondary sump 96 which draws fuel, in response to suction of the secondary fuel pump, from the primary bucket 112 via a strainer 120 and a pump transfer line 122 which transfers fuel from the primary bucket to a secondary bucket 124 in the secondary sump, in which the secondary fuel pump is located. In this regard, the pump transfer line 122 is able to draw fuel out of the primary side of the fuel tank because it is plumbed into the inlet side of the secondary fuel pump 118. The pump transfer line 122 includes a return tee 126. The secondary bucket 124 and the secondary MRA cover 108 are connected together, as for example by rods (not shown). Fuel is pumped under pressure by the secondary fuel pump 118 to a secondary feed port 108a of the secondary MRA cover 108 via a secondary feed line 128.

It is seen from the foregoing that fuel is pumped by the primary and secondary fuel pumps 110, 118 at a flow rate generally doubling the flow rate would be available to the engine if having only one MRA were used (as in the prior art). This feature is further enhanced in that both the primary and secondary fuel pumps are assured having fuel available to pump at all times up until the saddle fuel tank 80 runs dry of fuel, as will be further detailed hereinbelow.

Fuel is actively transferred from the secondary sump 96 to the primary sump 94 via a first primary jet pump 130, a first sump transfer line 132 which may or may not originate in the secondary bucket 124, and a first sump transfer line extension 132a. The first primary jet pump 130 is run by pressurized fuel in the primary feed line 116 via a first primary feed tap line 134. The first sump transfer line is connected to the inlet of the first primary jet pump and withdraws fuel from the secondary sump 96, while the first sump transfer line extension 132a is connected to at the outlet of the first primary jet pump 130 and delivers fuel to the primary bucket 112.

Fuel is also actively transferred from the secondary sump 96 to the primary sump 94 via a first secondary jet pump 136, a second sump transfer line 138 and a second sump transfer line extension 138a which may or may not originate in the secondary bucket 124. The first secondary jet pump 136 is run by pressurized fuel in the secondary feed line 128 via a first secondary feed tap line 140. The second sump transfer line extension 138a connects to the inlet of the first secondary jet pump 130 and withdraws fuel from the secondary sump 96, while the second sump transfer line 138 connects to the outlet of the first secondary jet pump and delivers fuel to the primary bucket 112.

In addition, fuel is actively transferred into the primary bucket 112 from the primary sump 94 via a second primary jet pump 144. The second primary jet pump 144 is run by pressurized fuel in the primary feed line 116 via a second primary feed tap line 148. Bulk fuel 150 in the primary sump is drawn into the primary bucket 112 by operation of the second primary jet pump 144, and is discharged into the primary bucket for immediate availability to the primary fuel pump 110.

In addition further, fuel is actively transferred into the secondary bucket 124 from the secondary sump 96 via a second secondary jet pump 152. The second secondary jet pump 152 is run by pressurized fuel in the secondary feed line 128 via a second secondary feed tap line 154. Bulk fuel 156 in the secondary sump is drawn into the secondary bucket 124 by operation of the second secondary jet pump 152, and is discharged into the primary bucket for immediate availability to the secondary fuel pump 118.

The primary feed line 116 transfers fuel under pressure from the primary fuel pump 110 to the primary feed port 104a of the primary MRA cover 104. A primary external feed line 160 is connected to the primary feed port 104a of the primary MRA cover 104, and connects with a fuel delivery system 500, 600 as discussed hereinbelow. A primary external return line 162 connects, in a manner to be described, with the aforementioned fuel delivery system 500, 600 and connects with a primary return port 104b of the primary MRA cover 104. A primary return line 164 connects with the primary return port 104b and delivers returned fuel to the primary bucket 112.

The secondary feed line 128 transfers fuel under pressure from the secondary fuel pump 118 to the secondary feed port 108a of the secondary MRA cover 108. A secondary external feed line 166 is connected to the secondary feed port 108a of the secondary MRA cover 108, and connects with aforementioned fuel delivery system 500, 600 as discussed hereinbelow. A secondary external return line 168 connects, in a manner to be described, with the aforementioned fuel delivery system 500, 600 and connects with a secondary return port 108b of the secondary MRA cover 108. A secondary return line 170 connects with the above mentioned return tee 126, whereupon the downstream portion of the pump transfer line 122 delivers returned fuel to the secondary bucket 124. The return tee 126 can be packaged as high as the secondary MRA cover 108, integrated therewith, integrated with the secondary fuel pump 118, or eliminated.

Figures 6, 7:
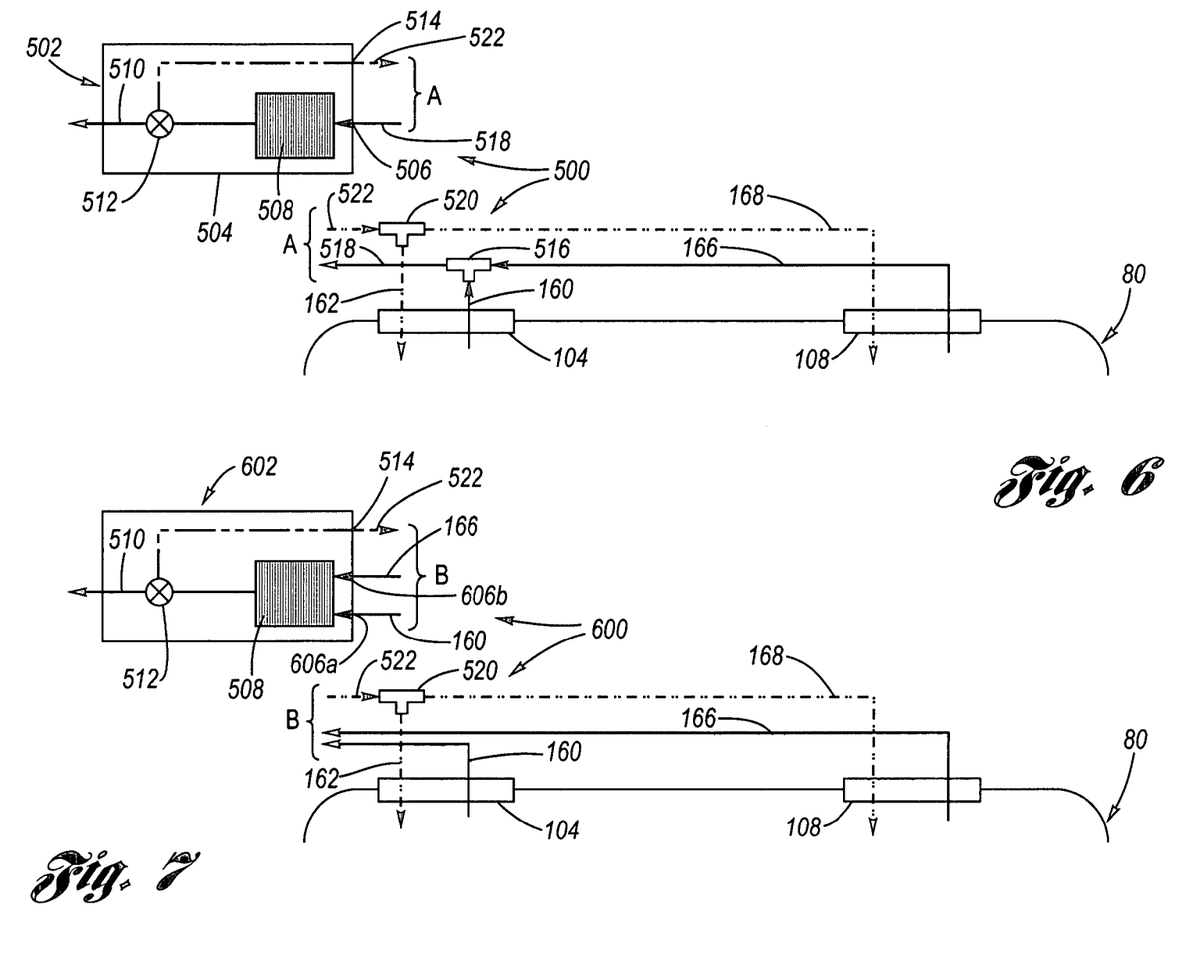
FIG. 6 is a schematic view of a first embodiment of a fuel delivery system for use with the first, second and third preferred embodiments of the dual fuel pump fuel extraction system according to the present invention.
FIG. 7 is a schematic view of a second embodiment of the fuel delivery system for use with the first, second and third preferred embodiments of the dual fuel pump fuel extraction system according to the present invention.

Referring now to FIGS. 6 and 7, the connection of the dual fuel pump fuel extraction system 100 to a fuel delivery system 500, 600 will be detailed.

FIG. 6 shows a fuel delivery system 500 in which a filter assembly 502 has a housing 504, an inlet 506, a fuel filter 508 connected to the inlet, a main fuel line 510 which exits the housing, a pressure regulator 512 teed into the main fuel line downstream of the fuel filter and an outlet 514 connected to the pressure regulator. The external primary feed line 160 and the external secondary feed line 166 both connect to an external feed tee 516, which, in turn, connects to a common external feed line 518 that connects to the inlet 506. The external primary return line 162 and the external secondary return line 168 both connect to an external return tee 520, which, in turn, connects to a common external return line 522 that connects to the outlet 514.

In general operation, fuel is provided by both the primary and secondary fuel pumps 114, 118, filtered at the fuel filter 508 and delivered via the main fuel line 510 to the engine, wherein the pressure regulator 512 maintains proper fuel pressure in the main fuel line. Fuel unused by the engine is returned to the primary and secondary buckets 112, 124.

In the special case of operation in which the secondary sump 96 is dry and the primary sump 94 has fuel (as when first built), the primary fuel pump 114 will pump fuel via the primary feed line 116 and primary MRA cover 104 and external primary feed line 160 to the primary external tee 516 and thereupon deliver fuel to the filter assembly 502, as well as feed fuel back along the external feed line 166, backwards through the secondary MRA cover 108, and finally back down through the secondary feed line 128 to the secondary fuel pump 118, which would then prime. Simultaneously, return fuel would start coming back from the pressure regulator 512 via the external secondary return line 168, to the secondary MRA cover 108, down along the secondary return line 170 to the return tee 126, and, via the downstream portion of the pump transfer line 122, into the secondary bucket 124, which would also then be available for the secondary fuel pump 118 to prime.

FIG. 7 shows a fuel delivery system 600 in which the filter assembly 602 is as discussed hereinabove with respect to the filter assembly 502 of the fuel delivery system 500 of FIG. 6, wherein like numbers refer to like parts, except now the external feed tee is eliminated, and the inlet is now a first inlet 606a connecting directly to the primary external feed line 160 and a second inlet 606b connecting directly to the secondary external feed line 166.

Figure 3:
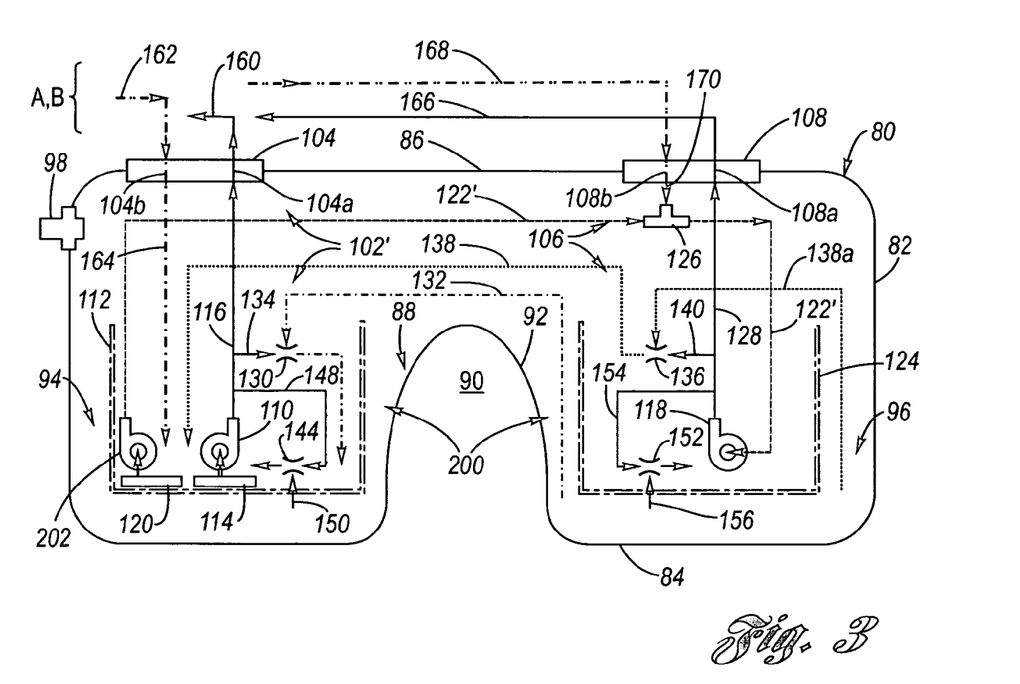
FIG. 3 is a schematic view of a saddle fuel tank equipped with a second preferred embodiment of the dual fuel pump fuel extraction system according to the present invention, which is similar to that of FIG. 2, wherein now an auxiliary fuel pump is included in the primary sump.

Referring now to FIG. 3, the second embodiment of the dual fuel pump fuel extraction system 200 is as discussed hereinabove with respect to the first embodiment of the duel fuel pump extraction system 100 of FIG. 2, wherein like numbers refer to like parts, except now the primary MRA 102' is modified to include an electric auxiliary fuel pump 202 is provided in the primary bucket 112. The auxiliary fuel pump 202 draws fuel through the strainer 120 in the primary bucket from the primary sump 94 and delivers it the pump transfer line 122' which is modified to connect therewith. The auxiliary fuel pump 202 affirmatively transfers fuel to the secondary bucket 124 so as to mitigate potential fuel vaporization that might otherwise occur at the secondary fuel pump 118. The aforesaid descriptions relating to connections to the fuel delivery systems 500, 600 directly apply and need not be repeated for brevity.

Figure 4:
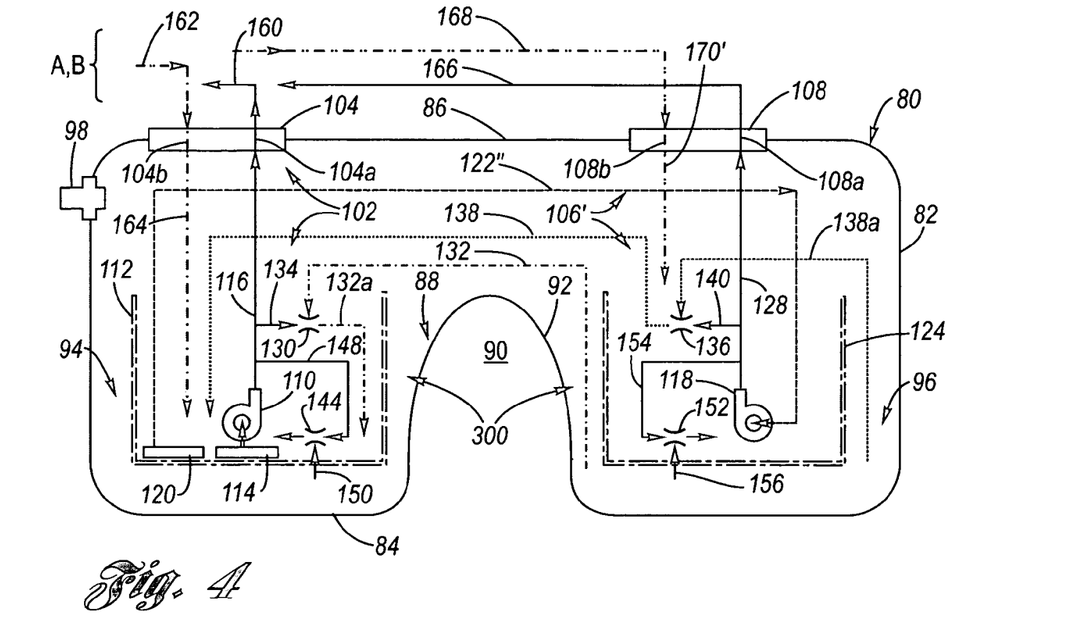
FIG. 4 is a schematic view of a saddle fuel tank equipped with a third preferred embodiment of the dual fuel pump fuel extraction system according to the present invention, which is similar to FIG. 2, wherein now the return tee is absent.

Referring now to FIG. 4, the third embodiment of the dual fuel pump fuel extraction system 300 is as discussed hereinabove with respect to the first embodiment of the duel fuel pump extraction system 100 of FIG. 2, wherein like numbers refer to like parts, except now the secondary MRA 106' is modified to eliminate the return tee 126, wherein the pump transfer line 122" is now continuous and the secondary return line 170' is modified to discharge fuel into the secondary bucket 124. The aforesaid descriptions relating to connections to the fuel delivery systems 500, 600 directly apply and need not be repeated for brevity.

Figure 5:
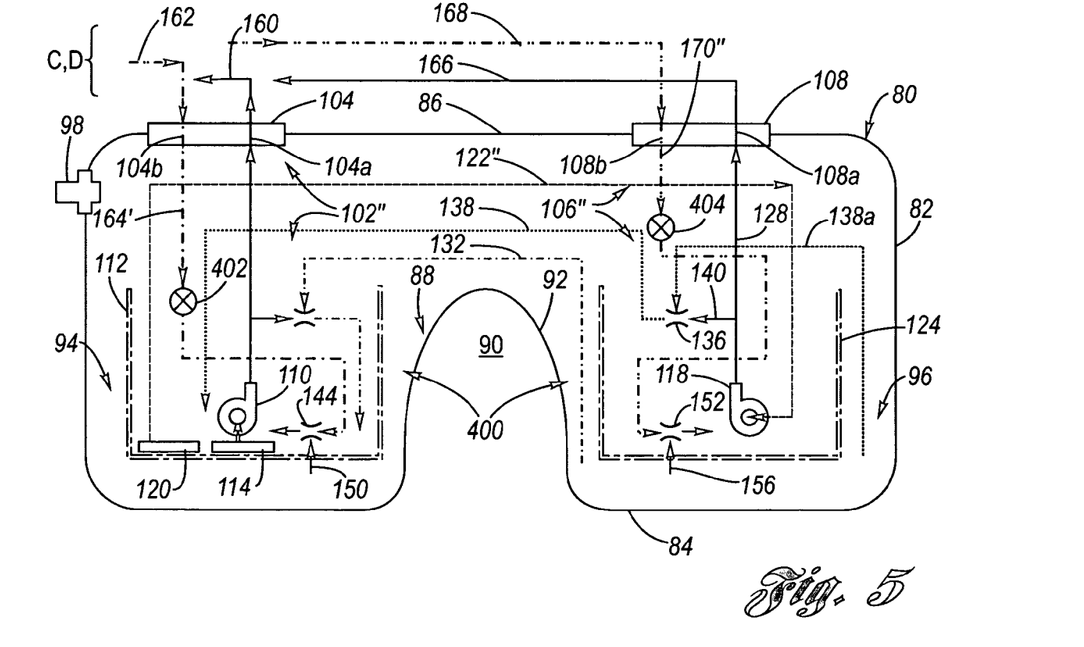
FIG. 5 is a schematic view of a saddle fuel tank equipped with a third preferred embodiment of a dual fuel pump fuel extraction system according to the present invention, which is similar to FIG. 4 wherein now a pair of pressure regulators are provided.

Referring now to FIG. 5, the fourth embodiment of the dual fuel pump fuel extraction system 400 is as discussed hereinabove with respect to the third embodiment of the duel fuel pump extraction system 300 of FIG. 5, wherein like numbers refer to like parts, except now the primary and secondary MRAs 102", 106" are modified. The primary return line 164' now includes a primary pressure regulator 402, and terminates in the primary bucket 112 as the fuel discharge therefrom runs the second primary jet pump 144, rather than a second primary tap line, which is now obviated. The secondary return line 170" now includes a secondary pressure regulator 404, and terminates in the secondary bucket 124 as the fuel discharge therefrom runs the second secondary jet pump 152, rather than a second secondary tap line, which is now obviated.

Figure 8:
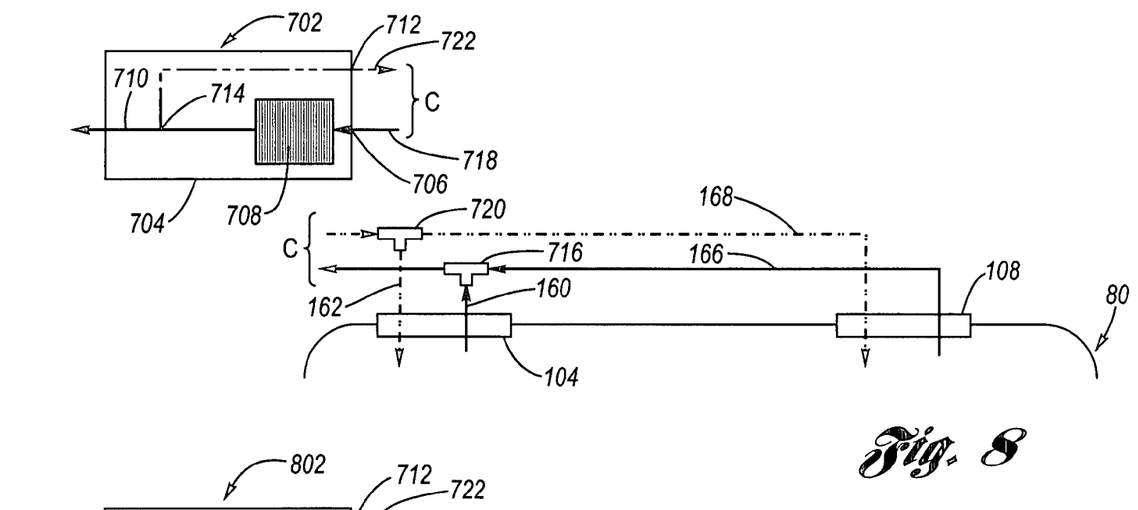
FIG. 8 is a schematic view of a third embodiment of the fuel delivery system for use with the fourth preferred embodiment of the dual fuel pump fuel extraction system according to the present invention.
Figure 9:
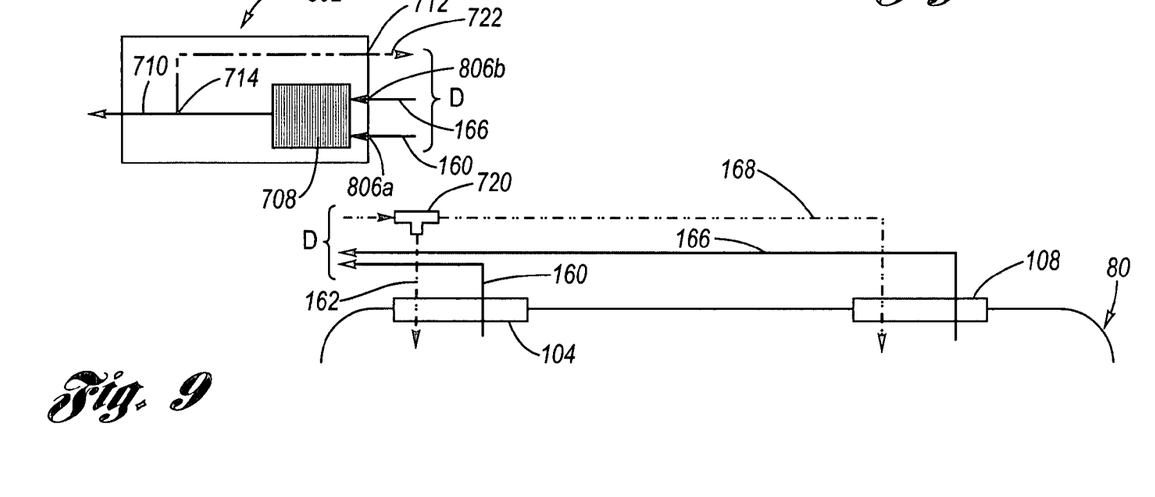
FIG. 9 is a schematic view of a fourth embodiment of the fuel delivery system for use with the fourth preferred embodiment of the dual fuel pump fuel extraction system according to the present invention.

Referring now to FIGS. 8 and 9, the connection of the dual fuel pump fuel extraction system 400 to a fuel delivery system 700, 800 will be detailed.

FIG. 8 shows a fuel delivery system 700 in which a filter assembly 702 has a housing 704, an inlet 706, a fuel filter 708 connected to the inlet, a main fuel line 710 which exits the housing, and an outlet 712 having a branch connection 714 downstream of the fuel filter to the main fuel line. The external primary feed line 160 and the external secondary feed line 166 both connect to an external feed tee 716, which, in turn, connects to a common external feed line 718 that connects to the inlet 706. The external primary return line 162 and the external secondary return line 168 both connect to an external return tee 720, which, in turn, connects to a common external return line 722 that connects to the outlet 712.

In operation, fuel is provided by both the primary and secondary fuel pumps 114, 118, filtered at the fuel filter 708 and delivered via the main fuel line 710 to the engine, wherein the primary and secondary pressure regulators 402, 404 maintain proper fuel pressure in the main fuel line. Fuel unused by the engine is returned to the primary and secondary buckets 112, 124.

FIG. 9 shows a fuel delivery system 800 having a filter assembly 802 which is as discussed hereinabove with respect to the filter assembly 702 of the fuel delivery system 700 of FIG. 8, wherein like numbers refer to like parts, except now the external feed tee is eliminated, and the inlet is now a first inlet 806a connecting directly to the primary external feed line 160 and a second inlet 806b connecting directly to the secondary external feed line 166.

The foregoing embodiments may be modified to suit particular applications, wherein several examples thereof are provided hereinbelow.

The addition of the auxiliary fuel pump 202 as shown in the dual fuel pump fuel extraction system 200 of FIG. 3, may be implemented also in the dual fuel pump fuel extraction system 300 of FIG. 4 and the dual fuel pump fuel extraction system 400 of FIG. 5.

The removal of return tee 126 as shown in of the dual fuel pump fuel extraction system 300 of FIG. 4, could be implemented in the dual fuel pump fuel extraction system 100 of FIG. 2, the dual fuel pump fuel extraction system 200 of FIG. 3 and the dual fuel pump fuel extraction system 400 of FIG. 5.

The removal of the pressure regulator from the filter assemblies 702, 802 and added to each of the primary and secondary MRAs 102", 106" by primary and secondary pressure regulators 402, 404, as shown in the dual fuel pump fuel extraction system 400 at FIG. 5, could be implemented in the dual fuel pump fuel extraction system 100 of FIG. 2, the dual fuel pump fuel extraction system 200 of FIG. 3 and the dual fuel pump fuel extraction system 300 of FIG. 4.

The tees 126, 520 and 516 may be adjusted for desired fuel flow rates, whether being equal or biased to favor the primary or secondary MRAs.

Figure 10:
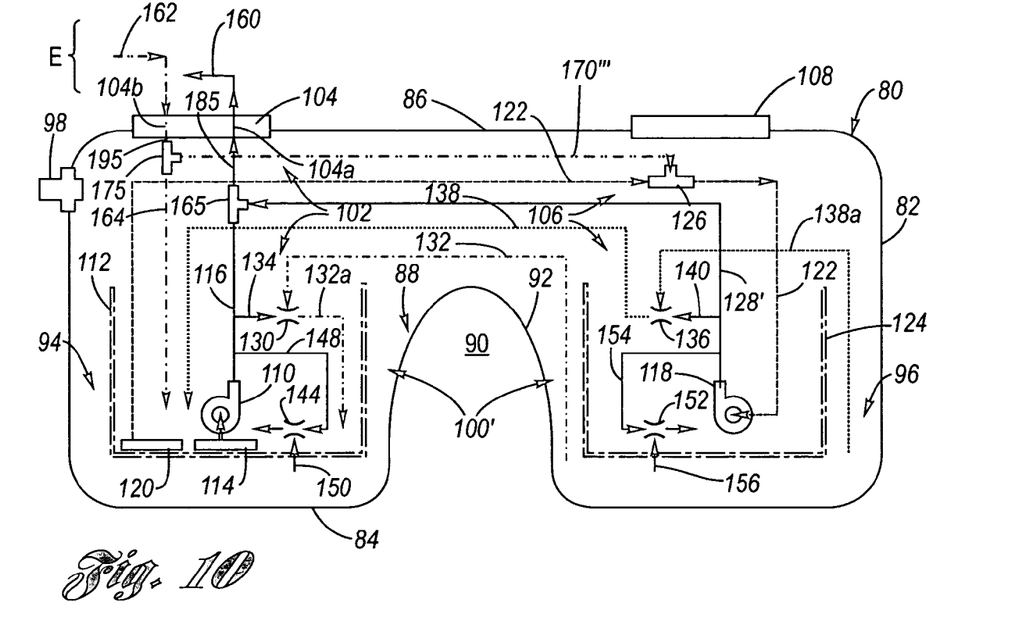
FIG. 10 is a schematic view of a saddle fuel tank equipped with a modification of the first preferred embodiment of the dual fuel pump fuel extraction system of FIG. 2.
Figure 11:
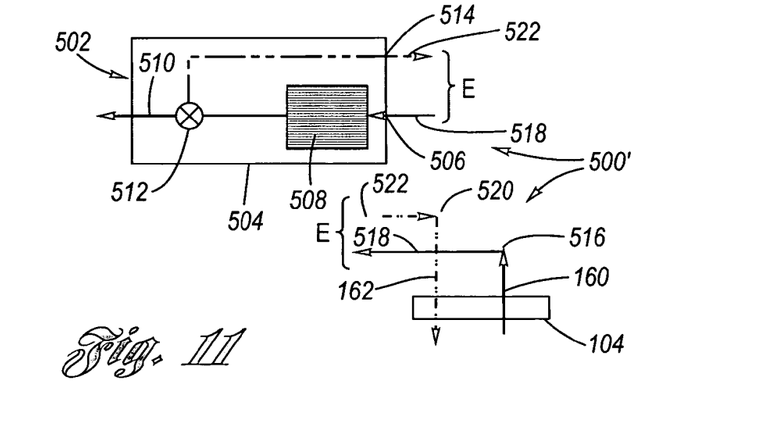
FIG. 11 is a schematic view of a modification of the first embodiment of a fuel delivery system of FIG. 6 for use with the modified embodiment of the dual fuel pump fuel extraction system of FIG. 10.

FIG. 10 shows a dual fuel pump fuel extraction system 100' which is a modification of the dual fuel pump fuel extraction system 100 of FIG. 2, wherein the secondary external feed and return lines 166, 168 are obviated. In this case, the secondary feed line 128' is modified to connect to a tee 165 inside the tank shell 82 to the primary feed line 116', and the secondary return line 170''' is modified to connect to a tee 175 inside the tank shell to the primary return line 164'. Now a common feed line 185 connects to the primary feed port 104a and a common return line 195 connects to the primary return port 104b. FIG. 11 depicts a fuel delivery system 500' which is modified from the fuel delivery system 500 of FIG. 6 to work with the dual fuel pump fuel extraction system 100' of FIG. 10, wherein like figures designate like parts. This arrangement would provide the additional benefit of reduced emissions.

Figure 12:
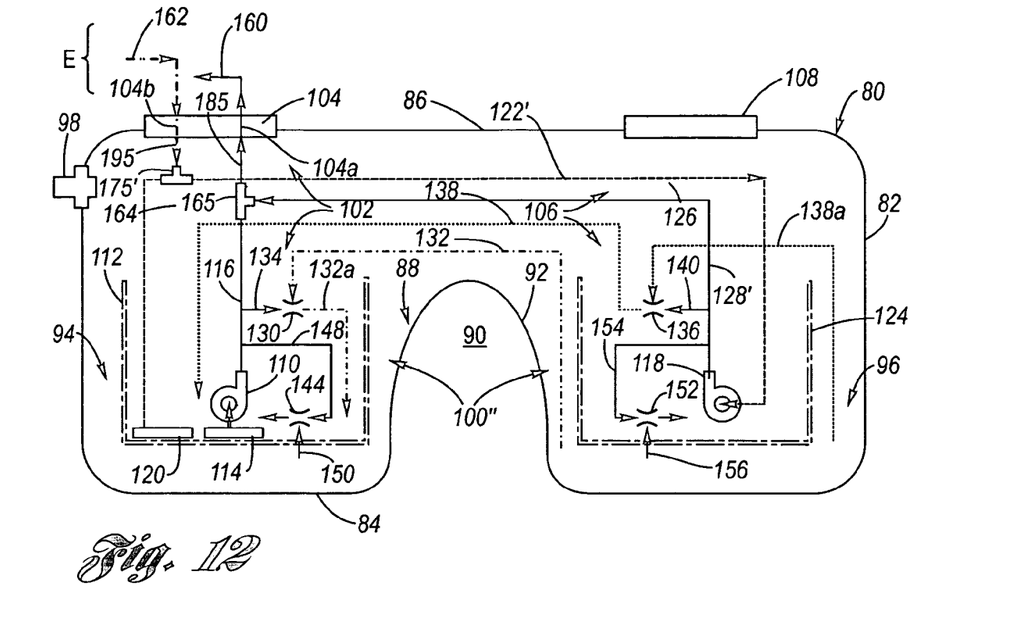
FIGS. 12 and 13 are schematic views of a saddle fuel tank equipped with further modifications of the first preferred embodiment of the dual fuel pump fuel extraction system of FIG. 2.

FIG. 12 shows a dual fuel pump fuel extraction system 100" for interconnecting with the fuel delivery system 500' which is a modification of the dual fuel pump fuel extraction system 100' of FIG. 10, wherein the secondary external feed and return lines 166, 168 are obviated, as are the secondary return line 170''', the primary return line 164, and the tees 175 and 126. Now tee 175' connects the common return line 195 to the pump transfer line 122.

Figure 13:
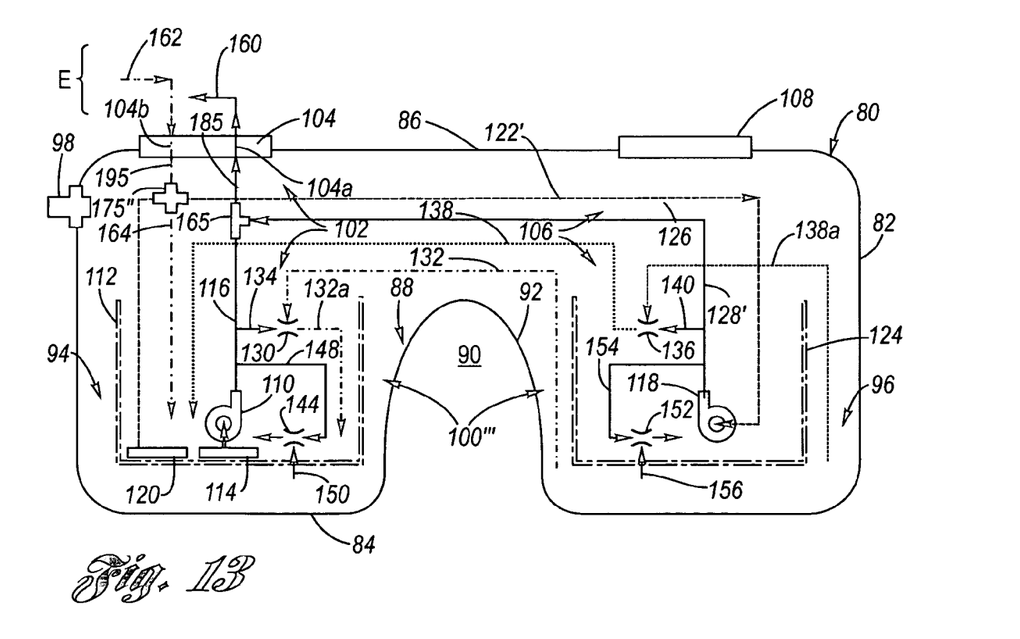

FIG. 13 shows a dual fuel pump fuel extraction system 100''' for interconnecting with the fuel delivery system 500' which is a modification of the dual fuel pump fuel extraction system 100" of FIG. 12, now including the primary return line 164. In this regard, the tee 175' of FIG. 12 is now a cross-tee 175" with pre-calibrated orifices for fuel flow balancing.

Further, the fuel delivery systems 500, 600, 700, 800 could be located within the fuel tank shell 82, having a form suitably packaged for an in-tank environment.

To those skilled in the art to which this invention appertains, the above described preferred embodiment may be subject to change or modification. Such change or modification can be carried out without departing from the scope of the invention, which is intended to be limited only by the scope of the appended claims.

The invention claimed is:

1. A fuel extraction system for a saddle fuel tank, the saddle fuel tank including a shell, a primary sump and a secondary sump, said fuel extraction system comprising:
   a primary modular reservoir assembly comprising:
      a primary fuel pump located in the primary sump;
      a primary modular reservoir assembly cover interfaced with the shell, said primary modular reservoir assembly cover comprising a primary feed port and a primary return port;
      a primary feed line connected to said primary fuel pump and said primary feed port; and
      a primary return line connected with said primary return port;
   a secondary modular reservoir assembly comprising:
      a secondary fuel pump located in the secondary sump;
      a secondary modular reservoir assembly cover interfaced with the shell, said secondary modular reservoir assembly cover comprising a secondary feed port and a secondary return port;
      a secondary feed line connected to said secondary fuel pump and said secondary feed port; and
      a secondary return line connected with said secondary return port; and
   a pump transfer line extending between the primary sump and the secondary sump;
   wherein said primary fuel pump draws fuel from the primary sump; and
   wherein said secondary fuel pump draws fuel from the primary sump via said pump transfer line.

2. The fuel extraction system of claim 1, further comprising:
   a first sump transfer line extending between the primary and secondary sumps;

a first pump connected with said first sump transfer line which pumps fuel from the secondary sump to the primary sump;

a second sump transfer line extending between the primary and secondary sumps; and a second pump connected with said second sump transfer line which pumps fuel from the primary sump to the secondary sump.

3. The fuel extraction system of claim 2, further comprising:

a primary bucket, said primary fuel pump being located in said primary bucket;

a secondary bucket, said secondary fuel pump being located in said secondary bucket;

a third pump in said primary bucket which pumps fuel from the primary sump into the primary bucket; and a fourth pump in said secondary bucket which pumps fuel from the secondary sump into the secondary bucket.

4. The fuel extraction system of claim 3, further comprising a filter assembly, said filter assembly comprising:

an inlet connected to said primary and secondary feed ports;

a fuel filter connected to said inlet;

a pressure regulator connected to said fuel filter;

a main fuel line connected with said pressure regulator which carries a first selected portion of the fuel provided by said primary and secondary fuel pumps responsive to said pressure regulator; and an outlet connected to said pressure regulator and said primary and secondary return ports, said outlet carrying a second selected portion of the fuel responsive to said pressure regulator.

5. The fuel extraction system of claim 4, further comprising:

a first strainer in said primary bucket which strains fuel entering said primary fuel pump; and a second strainer in said primary bucket which strains fuel entering said pump transfer line;

wherein said first and third pumps are jet pumps running on pressurized fuel from said primary feed line; and wherein said second and fourth pumps are jet pumps running on pressurized fuel from said secondary feed line.

6. The fuel extraction system of claim 3, further comprising a return tee connected with said secondary return line and said pump transfer line.

7. The fuel extraction system of claim 6, further comprising a filter assembly, said filter assembly comprising:

an inlet connected to said primary and secondary feed ports;

a fuel filter connected to said inlet;

a pressure regulator connected to said fuel filter;

a main fuel line connected with said pressure regulator which carries a first selected portion of the fuel provided by said primary and secondary fuel pumps responsive to said pressure regulator; and an outlet connected to said pressure regulator and said primary and secondary return ports, said outlet carrying a second selected portion of the fuel responsive to said pressure regulator.

8. The fuel extraction system of claim 7, further comprising:

a first strainer in said primary bucket which strains fuel entering said primary fuel pump; and a second strainer in said primary bucket which strains fuel entering said pump transfer line;

wherein said first and third pumps are jet pumps running on pressurized fuel from said primary feed line; and wherein said second and fourth pumps are jet pumps running on pressurized fuel from said secondary feed line.

9. The fuel extraction system of claim 3, further comprising an auxiliary pump in said primary bucket and connected with said pump transfer line which actively pumps fuel from the primary sump to the secondary sump.

10. The fuel extraction system of claim 9, further comprising a filter assembly, said filter assembly comprising:

an inlet connected to said primary and secondary feed ports;

a fuel filter connected to said inlet;

a pressure regulator connected to said fuel filter;

a main fuel line connected with said pressure regulator which carries a first selected portion of the fuel provided by said primary and secondary fuel pumps responsive to said pressure regulator; and an outlet connected to said pressure regulator and said primary and secondary return ports, said outlet carrying a second selected portion of the fuel responsive to said pressure regulator.

11. The fuel extraction system of claim 10, further comprising:

a first strainer in said primary bucket which strains fuel entering said primary fuel pump; and a second strainer in said primary bucket which strains fuel entering said auxiliary pump;

wherein said first and third pumps are jet pumps running on pressurized fuel from said primary feed line; and wherein said second and fourth pumps are jet pumps running on pressurized fuel from said secondary feed line.

12. The fuel extraction system of claim 11, further comprising a return tee connected with said secondary return line and said pump transfer line.

13. The fuel extraction system of claim 3, further comprising:

a primary pressure regulator connected to said primary return line; and a secondary pressure regulator connected to said secondary return line.

14. The fuel extraction system of claim 13, further comprising a filter assembly, said filter assembly comprising:

an inlet connected to said primary and secondary feed ports;

a fuel filter connected to said inlet;

a main fuel line connected with said fuel filter an outlet connected to said main fuel line and said primary and secondary return ports;

wherein said main fuel line carries a first selected portion of the fuel provided by said primary and secondary fuel pumps responsive to said primary and secondary pressure regulators; and wherein said outlet carries a second selected portion of the fuel responsive to said primary and secondary pressure regulators.

15. The fuel extraction system of claim 14, further comprising:

a first strainer in said primary bucket which strains fuel entering said primary fuel pump; and a second strainer in said primary bucket which strains fuel entering said pump transfer line;

wherein said first pump is a jet pump running on pressurized fuel from said primary feed line;

wherein said second pump is a jet pump running on pressurized fuel from said secondary feed line;
wherein said third pump is a jet pump running on fuel discharge from said primary return line; and
wherein said fourth pump is a jet pump running on fuel discharge from said secondary return line.

16. A saddle fuel tank and fuel extraction combination comprising:
   a saddle fuel tank comprising:
      a shell;
      a primary sump; and
      a secondary sump; and
   a fuel extraction system comprising:
      a primary modular reservoir assembly comprising:
         a primary fuel pump located in said primary sump;
         a primary modular reservoir assembly cover interfaced with said shell, said primary modular reservoir assembly cover comprising a primary feed port and a primary return port;
         a primary feed line connected to said primary fuel pump and said primary feed port; and
         a primary return line connected with said primary return port;
      a secondary modular reservoir assembly comprising:
         a secondary fuel pump located in said secondary sump;
         a secondary modular reservoir assembly cover interfaced with said shell, said secondary modular reservoir assembly cover comprising a secondary feed port and a secondary return port;
         a secondary feed line connected to said secondary fuel pump and said secondary feed port; and
         a secondary return line connected with said secondary return port; and
      a pump transfer line extending between said primary sump and said secondary sump;
   wherein said primary fuel pump draws fuel from said primary sump; and
   wherein said secondary fuel pump draws fuel from said primary sump via said pump transfer line.

17. The combination of claim 16, further comprising a filter assembly, said filter assembly comprising:
   an inlet connected to said primary and secondary feed ports;
   a fuel filter connected to said inlet;
   a pressure regulator connected to said fuel filter;
   a main fuel line connected with said pressure regulator which carries a first selected portion of the fuel provided by said primary and secondary fuel pumps responsive to said pressure regulator; and
   an outlet connected to said pressure regulator and said primary and secondary return ports, said outlet carrying a second selected portion of the fuel responsive to said pressure regulator.

18. The combination of claim 16, further comprising:
   a primary pressure regulator connected to said primary return line;
   a secondary pressure regulator connected to said secondary return line; and
   a filter assembly, said filter assembly comprising:
      an inlet connected to said primary and secondary feed ports;
      a fuel filter connected to said inlet;
      a main fuel line connected with said fuel filter
      an outlet connected to said main fuel line and said primary and secondary return ports;
   wherein said main fuel line carries a first selected portion of the fuel provided by said primary and secondary fuel pumps responsive to said primary and secondary pressure regulators; and
   wherein said outlet carries a second selected portion of the fuel responsive to said primary and secondary pressure regulators.

19. A fuel extraction system for a saddle fuel tank, the saddle fuel tank including a shell, a primary sump and a secondary sump, said fuel extraction system comprising:
   a primary modular reservoir assembly comprising:
      a primary fuel pump located in the primary sump;
      a primary modular reservoir assembly cover interfaced with the shell; and
      a primary feed line connected to said primary fuel pump;
   a secondary modular reservoir assembly comprising:
      a secondary fuel pump located in the secondary sump;
      a secondary modular reservoir assembly cover interfaced with the shell; and
      a secondary feed line connected to said secondary fuel pump;
      wherein at least one of said modular reservoir assembly covers has ports; and wherein said primary feed line and said secondary feed line connect with the ports;
   at least one return line connected with the ports; and
   a pump transfer line extending between the primary sump and the secondary sump;
   wherein said primary fuel pump draws fuel from the primary sump; and
   wherein said secondary fuel pump draws fuel from the primary sump via said pump transfer line.

20. The system of claim 19, further comprising a fuel delivery system connected with the ports, said fuel delivery system comprising:
   a fuel filter filtering fuel from said primary and secondary fuel pumps; and
   at least one pressure regulator regulating fuel carried by said at least one return line.

* * * * *